(No Model.)
J. Q. TUCKER.
BEEHIVE.
No. 592,180. Patented Oct. 19, 1897.
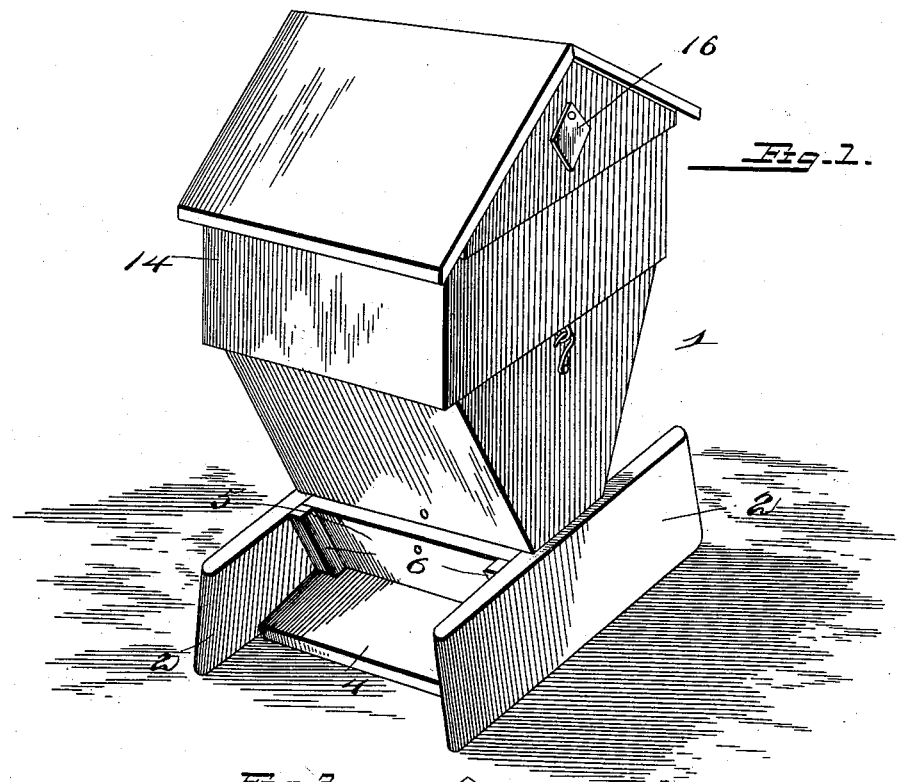
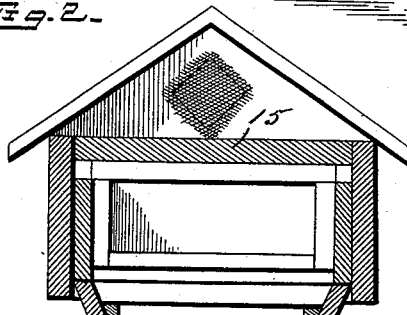
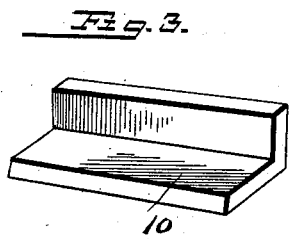
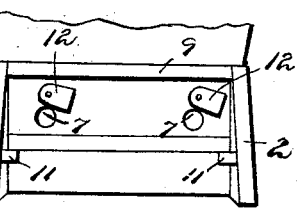
Witnesses
L. Wieser
J. F. Riley
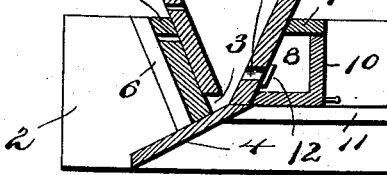
Inventor
John Q. Tucker.
By his Attorneys,
C. A. Snow & Co.

UNITED STATES PATENT OFFICE.

JOHN Q. TUCKER, OF BELFALLS, TEXAS.

BEEHIVE.

SPECIFICATION forming part of Letters Patent No. 592,180, dated October 19, 1897.

Application filed May 18, 1897. Serial No. 637,082. (No model.)

*To all whom it may concern:*

Be it known that I, JOHN Q. TUCKER, a citizen of the United States, residing at Belfalls, in the county of Bell and State of Texas, have invented a new and useful Beehive, of which the following is a specification.

The invention relates to improvements in beehives.

The object of the present invention is to improve the construction of beehives and to provide a simple and efficient one, which will permit food to be readily supplied to the bees when desired and enable the apiarian to have ready access to the food-chamber and permit him to cut off the bee-entrances to the same.

The invention consists in the construction and novel combination and arrangement of parts, as hereinafter fully described, illustrated in the accompanying drawings, and pointed out in the claim hereto appended.

In the drawings, Figure 1 is a perspective view of a hive constructed in accordance with this invention. Fig. 2 is a central vertical sectional view of the same. Fig. 3 is a detail perspective view of the removable tray. Fig. 4 is a rear elevation of the lower portion of the hive, the tray being removed.

Like numerals of reference designate corresponding parts in the several figures of the drawings.

1 designates a hive-body, substantially triangular in side elevation, tapering from the top to the bottom and provided with substantially parallel side pieces 2, which form the base of the hive and which rest upon the ground or other supporting-surface. The hive, which is provided at its front with a bee-entrance 3, has its bottom board 4 inclined downward and extended to form an alighting board or ledge, which is located between the adjacent portions of the side pieces 2 and which is protected by the same. The bee-entrance is closed when desired by a sliding door 5, mounted in suitable ways, which are preferably formed by cleats 6, secured to the inner faces of the side pieces 2 and spaced from the inclined front wall of the hive-body. The rear wall of the hive is provided with openings 7, forming bee entrances or passages to a food-chamber 8, formed by the rearward extensions of the side pieces 2, a top crosspiece 9, and a removable tray 10, which is substantially L-shaped in cross-section and which is supported by horizontal cleats 11, secured to the inner faces of the side pieces. The removable tray permits food to be readily supplied to the bees, and it can be readily cleaned when desired, and when it is not in use or removed the passages 7 are closed by pivoted doors 12, forming cut-offs and arranged to swing over the openings.

The hive-body is provided at the top of the brood-chamber with horizontal strips or bars, which, owing to the inclined sides of the body, are adapted to take the place of brood-frames, but complete brood-frames may be employed, if desired. A super 14 is detachably mounted upon the body and is secured to the same by suitable fastening devices, and it is provided with suitable honey boxes or frames, upon the top of which is mounted a cover-board 15, preferably composed of two sections. The super is provided with a hinged top, which has an oppositely inclined or slanted roof, and which is also provided with ventilating-openings, covered with wire-gauze or other suitable material, and pivoted plates 16 are mounted on the exterior of the top 15 and adapted to swing over the ventilating-openings.

It will be seen that the hive is provided with simple and efficient means for supplying food to the bees, that the food chamber or compartment can be readily cleaned, and that the bees can be readily shut out of the same.

Other advantages of the invention will be readily apparent to those skilled in the art to which this invention appertains, and I desire it to be understood that changes in the form, proportion, and minor details of construction may be resorted to without departing from the spirit or sacrificing any of the advantages of this invention.

What I claim is—

The combination in a hive provided at its back with a bee-passage and having rearwardly-extending side pieces, of the top crosspiece 9 connecting the side pieces at the upper edges thereof and disposed horizontally, the horizontal cleats 11 secured to the inner faces of the side pieces and located below the bee-passage, the removable tray supported upon the cleats 11 and comprising a horizontal bottom portion extending outward from the rear wall of the beehive and constituting the bottom of the food-chamber, and the vertical end wall extending upward from the outer edge of the horizontal portion to the outer edge of the cross-piece 9, and means for closing the bee-passage when the tray is removed, substantially as described.

In testimony that I claim the foregoing as my own I have hereto affixed my signature in the presence of two witnesses.

JOHN Q. TUCKER.

Witnesses:
JOHN O. BLACKWELL,
DICK R. HERNETT.